United States Patent
Hsieh et al.

(10) Patent No.: US 10,375,480 B2
(45) Date of Patent: Aug. 6, 2019

(54) LOUDSPEAKER UNIT

(71) Applicant: 1MORE INC., Shenzhen (CN)

(72) Inventors: Kuanhong Hsieh, Shenzhen (CN);
Bocheng You, Shenzhen (CN);
Shihchia Chiu, Shenzhen (CN)

(73) Assignee: 1MORE INC., Shenzhen, Guangdong Province (CN)

( * ) Notice: Subject to any disclaimer, the term of this patent is extended or adjusted under 35 U.S.C. 154(b) by 0 days.

(21) Appl. No.: 15/572,397

(22) PCT Filed: Aug. 2, 2017

(86) PCT No.: PCT/CN2017/095599
§ 371 (c)(1),
(2) Date: Nov. 7, 2017

(87) PCT Pub. No.: WO2018/024211
PCT Pub. Date: Feb. 8, 2018

(65) Prior Publication Data
US 2018/0234771 A1    Aug. 16, 2018

(30) Foreign Application Priority Data
Aug. 3, 2016   (CN) .................... 2016 2 0835117 U

(51) Int. Cl.
*H04R 9/02* (2006.01)
*H04R 9/06* (2006.01)
*H02K 33/02* (2006.01)
*H02K 33/12* (2006.01)
*H02K 33/18* (2006.01)

(52) U.S. Cl.
CPC ............... *H04R 9/06* (2013.01); *H02K 33/02* (2013.01); *H02K 33/12* (2013.01); *H02K 33/18* (2013.01); *H04R 9/02* (2013.01); *H04R 9/025* (2013.01); *H04R 2400/03* (2013.01); *H04R 2400/07* (2013.01); *H04R 2400/11* (2013.01)

(58) Field of Classification Search
CPC ...... H04R 9/02; H04R 9/025; H04R 2400/03; H04R 2400/07; H02K 33/02; H02K 33/12; H02K 33/18
USPC ........................................ 381/396, 412, 420
See application file for complete search history.

(56) References Cited

U.S. PATENT DOCUMENTS

| | | | | |
|---|---|---|---|---|
| 6,611,605 B2* | 8/2003 | Kim | ........................ | H04R 9/025 381/396 |
| 7,212,647 B2* | 5/2007 | Kaneda | .................... | H04R 9/02 381/345 |
| 7,529,381 B2* | 5/2009 | Kaneda | .................. | B06B 1/045 381/400 |

FOREIGN PATENT DOCUMENTS

WO    WO-2008072830 A1 *  6/2008 ............. H04R 1/083

* cited by examiner

*Primary Examiner* — Jesse A Elbin
(74) *Attorney, Agent, or Firm* — Cheng-Ju Chiang

(57) ABSTRACT

A loudspeaker unit includes: a housing (100), a magnetic assembly (300) disposed in the housing (100), a diaphragm (220) disposed on the housing (100), a first voice coil (210a) connected to the diaphragm (220), and the magnetic assembly (300) is connected to the housing (100) by an elastic element (400). The magnetic assembly (300) vibrates along with the elastic element (300) with respect to the housing (100) when the elastic element (400) vibrates.

18 Claims, 11 Drawing Sheets

LOUDSPEAKER UNIT

CROSS REFERENCE TO RELATED APPLICATION

This application claims priority to Chinese Patent Application No. 201620835117.6, entitled "LOUDSPEAKER UNIT" filed on Aug. 3, 2016, the contents of which are expressly incorporated by reference herein in its entirety.

FIELD OF THE INVENTION

The present disclosure relates to the field of loudspeakers, and more particularly relates to a loudspeaker unit.

BACKGROUND OF THE INVENTION

In general, a dynamic earphone includes a magnetic assembly, a voice coil, and a diaphragm. The voice coil is located in the magnetic field of the magnetic assembly. When an audio electrical signal at a certain frequency passes through the voice coil, the voice coil vibrates at the frequency of the audio electrical signal under the action of the magnetic field force, and simultaneously vibrates the diaphragm at the same frequency, thereby restoring the audio electrical signal into sound. However, the magnetic assembly in the dynamic earphone is immobilized, the vibration of the voice coil drives the diaphragm to produce vibration, thereby producing a deep low-frequency sound, which lacks a certain dynamic effect.

SUMMARY OF THE INVENTION

Accordingly, it is necessary to provide a loudspeaker unit having a dynamic feature to improve the acoustic effect, and an earphone having the loudspeaker unit.

A loudspeaker unit includes: a housing, a magnetic assembly disposed in the housing, a diaphragm disposed on the housing, a first voice coil connected to the diaphragm, and the magnetic assembly is connected to the housing by an elastic element. The magnetic assembly vibrates along with the elastic element with respect to the housing when the elastic element vibrates.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present. As used herein, the terms "left", "right" and similar expressions used herein is for the purpose of describing particular embodiments only and is not intended to be limiting of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The term "and/or" as used herein includes any and all combinations of one or more of the associated listed items.

Figure 1:
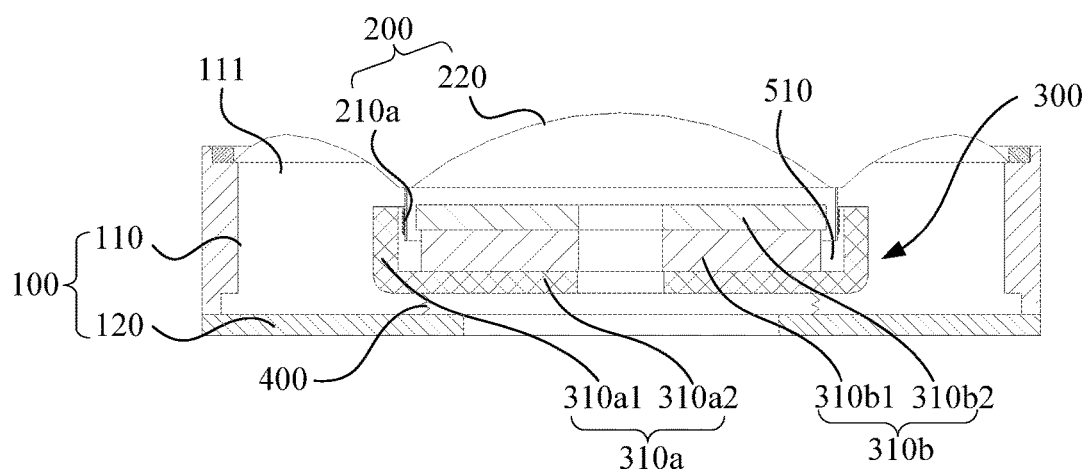
FIG. 1 is a schematic view of a loudspeaker unit with a vertically arranged wavy elastic element according to an embodiment.

Referring to FIG. 1, a loudspeaker unit according to an embodiment includes a housing 100, a magnetic assembly 300, an elastic element 400, and an acoustic assembly 200. The magnetic assembly 300 and the acoustic assembly 200 are located in the housing 100. The magnetic assembly 300 is connected to the housing 100 by the elastic element 400. The magnetic assembly 300 is suspendingly disposed in the housing 100 by the elastic element 400. In other words, the magnetic assembly 300 is not in directly contact with the housing 100. The magnetic assembly 300 can vibrate in the housing 100 by the support and elasticity of the elastic element 400. The acoustic assembly 200 includes a diaphragm 220 and a first voice coil 210a. The diaphragm 220 is connected to the housing 100, and the first voice coil 210a is mounted on the diaphragm 220. The vibration of the first voice coil 210a will cause the diaphragm 220 to vibrate. The magnetic assembly 300 vibrates up and down along with the elastic element 400 with respect to the housing 100 when the elastic element 400 vibrates.

Specifically, the housing 100 includes a bracket 110 and a protective cover 120. The bracket 110 is mounted on the protective cover 120. The bracket 110 and the protective cover 120 may be formed by two separate structures or be integrally formed. The bracket 110 and the protective cover 120 cooperatively form a sleeve structure having an opening 111. Under some circumstance, for example, when the loudspeaker unit is subject to an impact or violent swing, the magnetic assembly 300 may undergo severe vibration with respect to the housing 100. Since the magnetic assembly 300 is restricted in the housing 100 by the protective cover 120, a vibration amplitude of the magnetic assembly 300 is limited by the protective cover 120, thereby preventing the magnetic assembly 300 from damaging the diaphragm 220 or vibrating out of the housing 100 due to an excessive amplitude.

Figure 3:
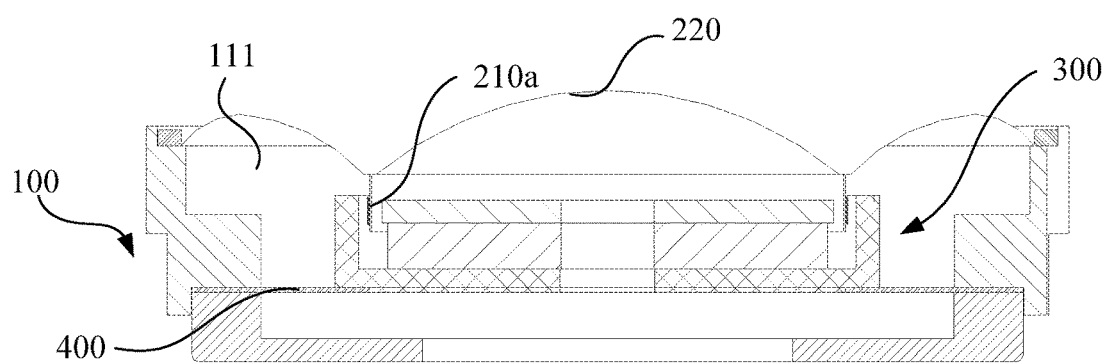
FIG. 3 is a schematic view of a loudspeaker unit with a horizontally arranged linear elastic element according to an embodiment.

Referring to FIG. 1 and FIG. 3, the magnetic assembly 300 includes a first magnetic sleeve 310a and a first columnar magnet 310b. The first magnetic sleeve 310a has a U-shaped axial section as a whole. The first columnar magnet 310b includes a first magnetic steel 310b1 and a first washer 310b2. The first magnetic sleeve 310a includes a first magnetic bottom cover 310a2 and a first magnetic sleeve body 310a1. The first magnetic sleeve body 310a1 is mounted on an edge of the first magnetic bottom cover 310a2. The first magnetic steel 310b1 is mounted at a center of the first magnetic bottom cover 310a2. The first washer 310b2 is fixed on one end of the first magnetic steel 310b1 adjacent to the diaphragm 220. The polarity of the first washer 310b2 is opposite to that of the first magnetic sleeve 310a. In general, the first washer 310b2 is an N-pole (positive pole), and the first magnetic sleeve 310a is a S-pole (negative pole). The first magnetic sleeve body 310a1 and the first columnar magnet 310b cooperatively form a first annular gap 510. The first voice coil 210a is at least partially located in the first annular gap 510.

A uniform magnetic field is distributed in the first annular gap 510. When an audio electrical signal passes through the first voice coil 210a, the first voice coil 210a is an electrified coil, and the current through the first voice coil 210a is an alternating current. According to the Fleming left-hand rule, the first voice coil 210a is vibrated by pushing and pulling, thereby driving the diaphragm 220 to move vertically with respect to the housing 100. More specifically, the diaphragm 220 is driven to move ascending and descending with respect to the protective cover 120. Since the magnetic assembly 300 is suspended on the elastic element 400 with respect to the housing 100, when the first voice coil 210a is driven by magnetic action produced by the magnetic assembly 300 to vibrate the diaphragm 220 so as to restore the audio electrical signal, the first voice coil 210a is in turn applied to the magnetic assembly 300 with a reaction force of the same strength as the magnetic force under the influence of the action force and the reaction force, such that the magnetic assembly 300 also vibrates vertically with respect to the housing 100, the vibration sound of the magnetic assembly 300 is transmitted through the bone to the user's eardrum, thus the sound generated by the loudspeaker unit has a certain dynamic, the dynamic experience of users may be enhanced without further additional elements. The aforementioned objectives may be achieved by the vibration of the magnetic assembly 300 itself.

Figure 4:
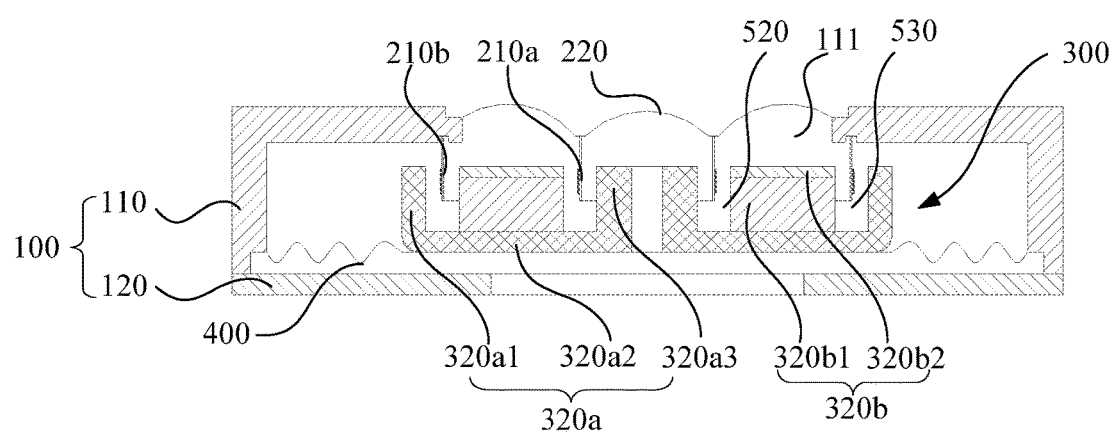
FIG. 4 is a schematic view of a loudspeaker unit with a horizontally arranged wavy elastic element according to another embodiment.
Figure 5:
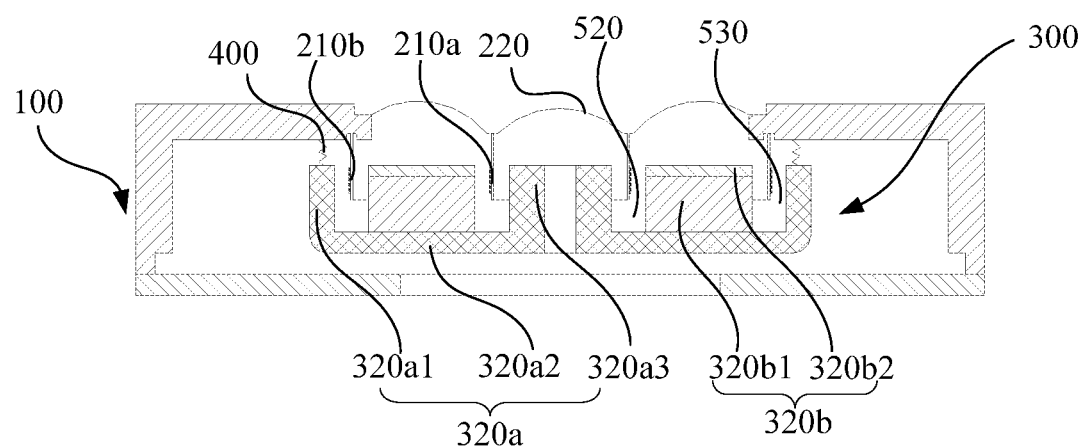
FIG. 5 is a schematic view of a loudspeaker unit with a vertically arranged wavy elastic element according to another embodiment.
Figure 6:
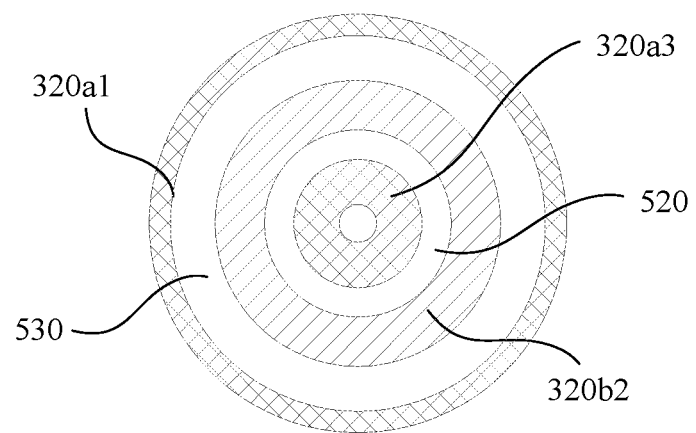
FIG. 6 is a top plan view of a magnetic assembly according to another embodiment.

Referring to FIG. 4 to FIG. 6, in another embodiment, the magnetic assembly 300 includes a second magnetic sleeve 320a and a second columnar magnet 320b. The polarity of the second columnar magnetic 320b is opposite to that of the second magnetic sleeve 320a. The second magnetic sleeve 320a includes a second magnetic bottom cover 320a2, a second magnetic sleeve body 320a1, and a third magnetic sleeve body 320a3. Apparently, the polarities of the second magnetic sleeve body 320a1 and the third magnetic sleeve body 320a3 are the same. The third magnetic sleeve body 320a3 is surrounded in the second magnetic sleeve body 320a1. The second magnetic sleeve body 320a1 is connected to an edge of the second magnetic bottom cover 320a2. The second columnar magnet 320b is connected to the second magnetic bottom cover 320a2, and is located in an annular groove cooperatively formed by the second magnet sleeve body 320a1 and the third magnetic sleeve body 320a3. In other words, the third magnetic sleeve body 320a3 is surrounded by the second columnar magnet 320b, while the second columnar magnet 320b is surrounded by the second magnetic sleeve body 320a1. The second columnar magnetic 320b includes a second magnetic steel 320b1 and a second washer 320b2. The second washer 320b2 is connected to the second magnetic bottom cover 320a2, and the second washer 320b2 is mounted on the other end of the second magnet steel 320b1. A second annular gap 520 is cooperatively formed between the second columnar magnet 320b and the third magnetic sleeve body 320a3, and a third annular gap 530 is cooperatively formed between the second columnar magnet 320b and the second magnetic sleeve body 320a1.

The loudspeaker unit further includes a second voice coil 210b connected to the housing 100. The second voice coil is mounted on the housing 100 and is located in the third annular gap 530, and the first voice coil 210a is located in second annular gap 520. Since the third columnar magnet 320b is located just between the second magnetic sleeve body 320a1 and the second columnar magnet 320a3, magnetic fields having uniform magnetic strength are independently formed in the third annular gap 530 and the second annular gap 530. When the audio electrical signal passes through the first voice coil 210a and the second voice coil 210b, the energized first voice coil 210a and the energized second voice coil 210b are each subjected to the magnetic force produced by the magnetic assembly 300. Since the first voice coil 210a is required to drive the diaphragm 220 to restore the electrical signal into sound, the reaction force of the first voice coil 210a acting on the magnetic assembly 300 with regard to the same magnetic force is relatively weak. While one end of the second voice coil 210b is fixedly connected to the housing 100, and the second voice coil 210b is still in a stationary state when it is subjected to the magnetic force of the magnetic assembly 300, the reaction force of the second voice coil 210b acting on the magnetic assembly 300 with regard to the same magnetic force is stronger, thus the vertical vibration of the magnetic assembly 300 is enhanced. The magnetic assembly 300 is subjected to a stronger reaction force due to the vibration strengthening effect of the second voice coil 210b, and the magnetic assembly 300 can be driven to move vertically with respect to the housing, thereby providing a stronger dynamic effect.

Figure 7:
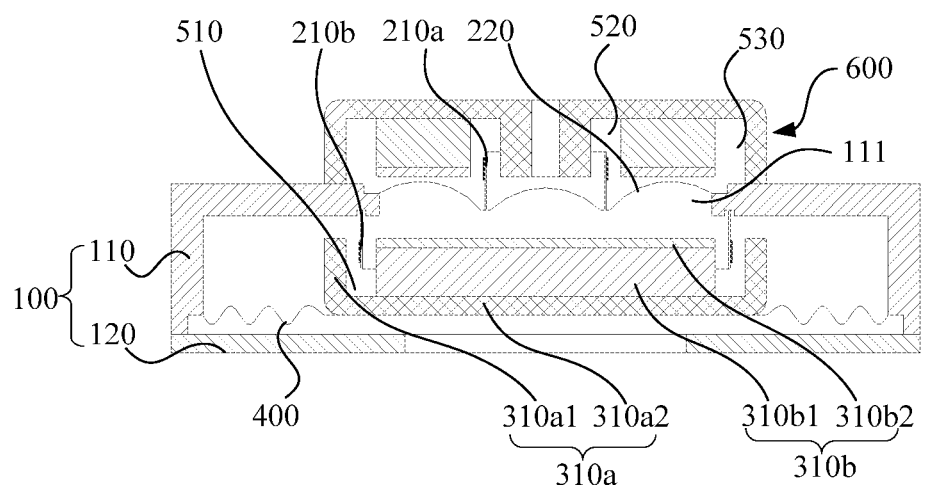
FIG. 7 is a schematic view of a loudspeaker unit according to yet another embodiment.

Referring to FIG. 7, a loudspeaker unit according to yet another embodiment includes a housing 100, a diaphragm 220, a magnetic assembly 300, an elastic element 400, an auxiliary magnetic assembly 600, a first voice coil 210a, and a second voice coil 210b. The magnetic assembly 300 is disposed in the housing 100, and the diaphragm 220 is disposed on the housing 100. One end of the first voice coil 210a is connected to the diaphragm 220, the other end thereof extends into a magnetic field of the auxiliary magnet assembly 600. One end of the second voice coil 210b is connected to the housing 100, the other end thereof extends into a magnetic field of the magnetic assembly 300. The magnetic assembly 300 is connected to the housing 100 by the elastic element 400. The magnetic assembly 300 vibrates along with the elastic element 400 with respect to the housing when the elastic element 400 vibrates. The auxiliary magnetic assembly 600 may be provided at the opening 111 of the housing 100, and the structure of the auxiliary magnetic assembly 600 is the same as that of the magnetic assembly 300 described above with reference to FIGS. 4, 5, and 6.

Specifically, the auxiliary magnetic assembly 600 includes the second magnetic sleeve 320a and the second columnar magnet 320b. The second magnetic sleeve 320a includes the second magnetic bottom cover 320a2, the second magnetic sleeve body 320a1, and the third magnetic sleeve body 320a3. The second magnetic sleeve body 320a1 and the third magnetic sleeve body 320a3 are connected to the edge of the second magnetic bottom cover 320a2. The second columnar magnet 320b is connected to the second magnetic bottom cover 320a2 and is located in the annular groove cooperatively formed by the second magnet sleeve body 320a1 and the third magnetic sleeve body 320a3. The second annular gap 520 is cooperatively formed between the second columnar magnet 320b and the third magnetic sleeve body 320a3, and the third annular gap 530 is cooperatively formed between the second columnar magnet 320b and the second magnetic sleeve body 320a1. The other end of the first voice coil 210a extends into the second annular gap 520.

In the illustrated embodiment, the magnetic assembly 300 includes the first magnetic sleeve 310a and the first columnar magnet 310b. The first magnetic sleeve 310a has a U-shaped axial section as a whole. The first columnar magnet 310b includes the first magnetic steel 310b1 and the first washer 310b2. The first magnetic sleeve 310a includes the first magnetic bottom cover 310a2 and the first magnetic sleeve body 310a1. The first magnetic sleeve body 310a1 is mounted on the edge of the first magnetic bottom cover 310a2. The first magnetic steel 310b1 is mounted at the center of the first magnetic bottom cover 310a2. The first washer 310b2 is fixed on one end of the first magnetic steel 310b1 adjacent to the diaphragm 220. The polarity of the first washer 310b2 is opposite to that of the first magnetic sleeve 310a. In general, the first washer 310b2 is an N-pole (positive pole), and the first magnetic sleeve 310a is a S-pole (negative pole). The first magnetic sleeve body 310a1 and the first columnar magnet 310b cooperatively form the first annular gap 510. The second voice coil 210b is located in the first annular gap 510.

Since the auxiliary magnetic assembly 600 drives the second voice coil 210b, which is only configured to drive the diaphragm 220 to sound independently. The magnetic assembly 300 drives the first voice coil 210a, and the reaction force generated by the first voice coil 210a is only configured to drive the magnetic assembly 300 to be vertically moved. The sound and the vibrating sound are separated from each other without interference, thus both the sound quality of the auxiliary magnetic assembly 600 and the dynamic effect of the vibrating sound caused by the vibration sound generated by the vibration of the magnetic assembly 300 cannot be affected.

Figure 8:
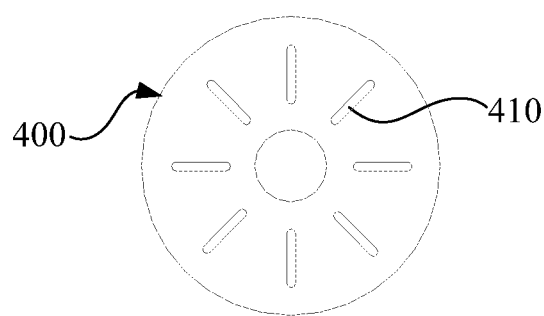
FIG. 8 is a schematic view of a circular elastic sheet.

In the aforementioned embodiments, the elastic element 400 may be strip-shaped elastic sheets, which are uniformly distributed radially surrounding the circumferential direction of the magnetic assembly. The number of the strip-shaped elastic sheet may be two, three or more. The reasonable number of the strip-shaped elastic sheet can be determined according to the weight of the magnetic assembly 300. Of course, the strip-shaped elastic sheet may be linear, or wavy with a plurality of bending portion. The elastic element 400 may also be a circular elastic sheet, such as a belleville spring. As shown in FIG. 8, the circular elastic sheet defines a plurality of through holes 410 evenly spaced on an edge thereof. The through hole 410 can reduce the weight of the circular elastic sheet. The circular elastic sheet may also be provided with a boss configured to enhance the overall elasticity of the circular elastic sheet.

Figure 2:
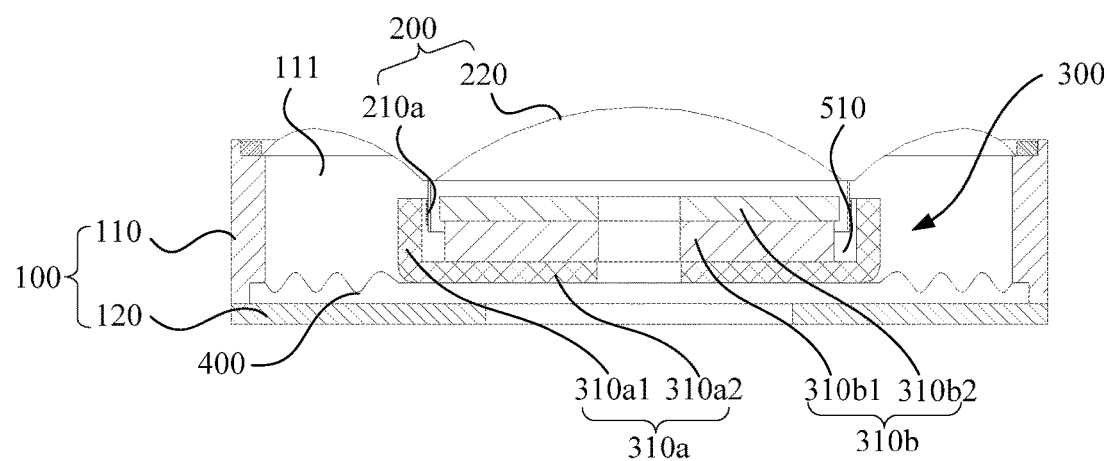
FIG. 2 is a schematic view of a loudspeaker unit with a horizontally arranged wavy elastic element according to an embodiment.

Specifically, referring to FIG. 2, the magnetic assembly 300 is connected to the bracket 110 by the elastic element 400. In other words, one end (fixed end) of the elastic element 400 is mounted on the bracket 110, the magnetic assembly 300 is mounted on the other end (free end) of elastic element 400, and the elastic element 400 is in a horizontal arrangement state at this time. The free end of the elastic element 400 produces an angular displacement that swings up and down with respect to the fixed end thereof during vibration. It should be understood that, referring to FIG. 5, the elastic element 400 may also be in a vertical arrangement state. The magnetic assembly 300 generates tension against the elastic element 400, i.e., the magnetic assembly 300 is suspended on the elastic element 400. Of course, referring to FIG. 1, the magnetic assembly 300 may also be connected to the protective cover 120 by the elastic element 400. In other words, one end (fixed end) of the elastic element 400 is mounted on the protective cover 120, and the magnetic assembly 300 is mounted on the (free end) of the elastic element 400, and the elastic element 400 is in a vertical arrangement state at this time. The magnetic assembly 300 generates pressure against the elastic element 400, i.e., the elastic element 400 forms elastic supporting effect to the magnetic assembly 300. The free end of the elastic element 400 produces vertical up-and-down movement with respect to the fixed end thereof during vibration.

It should be noted that, when the loudspeaker unit undergoes a dramatic swing or falls from a height, the magnetic assembly 300 may have an excessive upward vibration amplitude, thereby damaging the diaphragm. In order to limit the amplitude of the magnetic assembly 300 vibrating in the housing 100 along with the elastic element 400, a limiting structure may be provided in the housing such that the magnetic assembly 300 vibrates along with the elastic element 400 within a limited range. Due to the effect of vibration of the magnetic assembly 300 through the stretch elasticity properties of the elastic element 400, the limiting structure may limit the vibration amplitude of the magnetic assembly 300 to a certain extent by limiting the vibration amplitude of the elastic element 400. Alternatively, the motion amplitude of the magnetic assembly 300 with respect to the housing 100 may also be limited by the structure disposed between the magnetic assembly 300 and the housing 100. Of course, the limiting structure may simultaneously limit the vibration amplitude of the elastic element 400 and the magnetic assembly 300 with respect to the housing 100.

Figure 9:
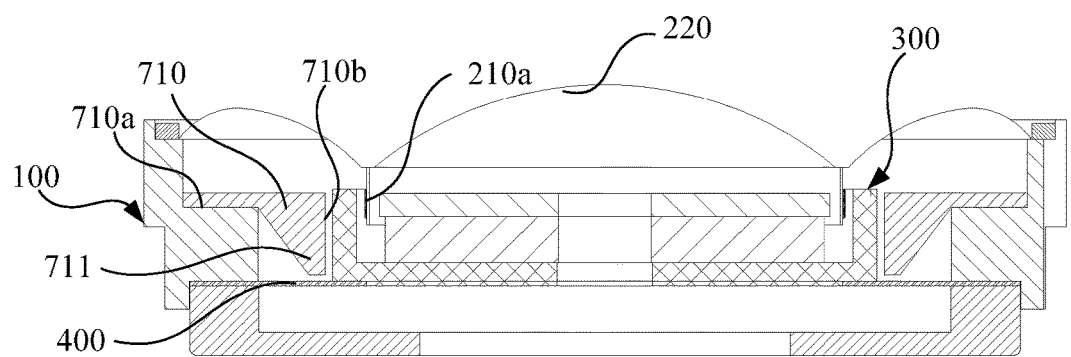
FIG. 9 is a schematic view of a limiting member according to an embodiment.

Specifically, referring to FIG. 9, the limiting structure includes a limiting member 710. An outer side 710a of the limiting member 710 is fixed on the housing 100, and an inner side 710b of the limiting member 710 is in clearance fit with the magnetic assembly 300. In other words, when the magnetic assembly 300 vibrates along with the elastic element 400, the limiting member 710 will not interfere with vibration effect of the magnetic assembly 300 due to a clearance between the inner side 710b of the limiting member 710 and the magnetic assembly 300. The vibration amplitude of the elastic element 400 is limited, thus the magnetic assembly 300 can be effectively prevented from throwing out of the housing 100 or striking the diaphragm 220 due to the excessive vibration amplitude with respect to the housing 100. Of course, the limiting member 710 has a variety of ways of limiting the resilient member 400, such as the limiting member 710 has an extending portion 711 at a side 710b thereof adjacent to the magnetic assembly 300. A clearance is defined between the extending portion 711 and the elastic element 400, so as to satisfy a normal vibration space for the magnetic assembly 300, while the extending portion 711 may limit the vibration amplitude of the elastic element 400 when the vibration amplitude is strong. Thus, the extending portion 711 limits the vibration amplitude of the elastic element 400 when the magnetic assembly 300 vibrates along with elastic element with respect to the housing.

Figure 10:
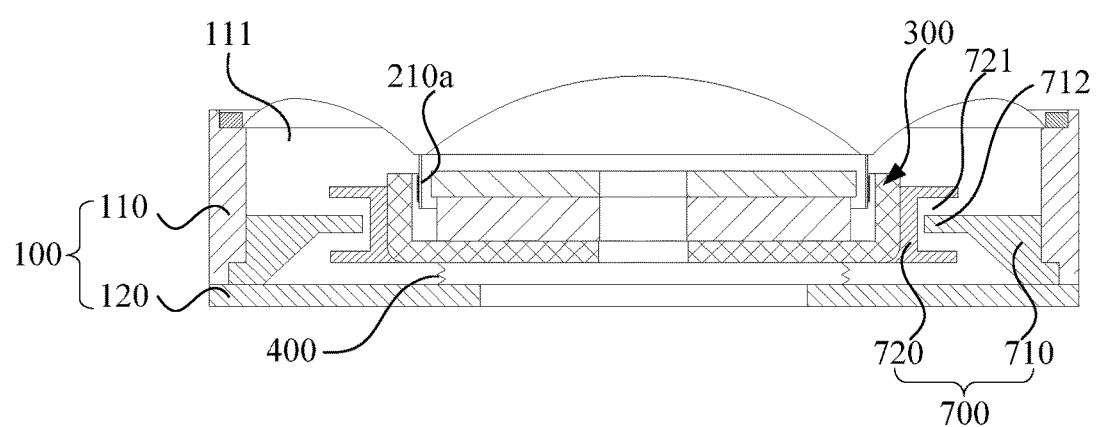
FIG. 10 is a schematic view of a limiting structure according to an embodiment.

In one embodiment, referring to FIG. 10, the limiting structure 700 further includes a stopper 720, which is fixedly sleeved on the magnetic assembly 300. The stopper 720 defines a groove 721, and the limiting member 710 has an inserting end 712. The inserting end 712 is movably inserted in the groove 721. Thus, when the magnetic assembly 300 vibrates along with the elastic element 400 with respect to the housing 100, since the relative movement between the inserting end 712 and the groove 721 is confined within the groove 721, the amplitude of the relative vibration between the magnetic assembly 300 and the housing 100, which are respectively fixedly connected to the stopper 720 and the limiting member 710 will also be limited.

Figure 11:
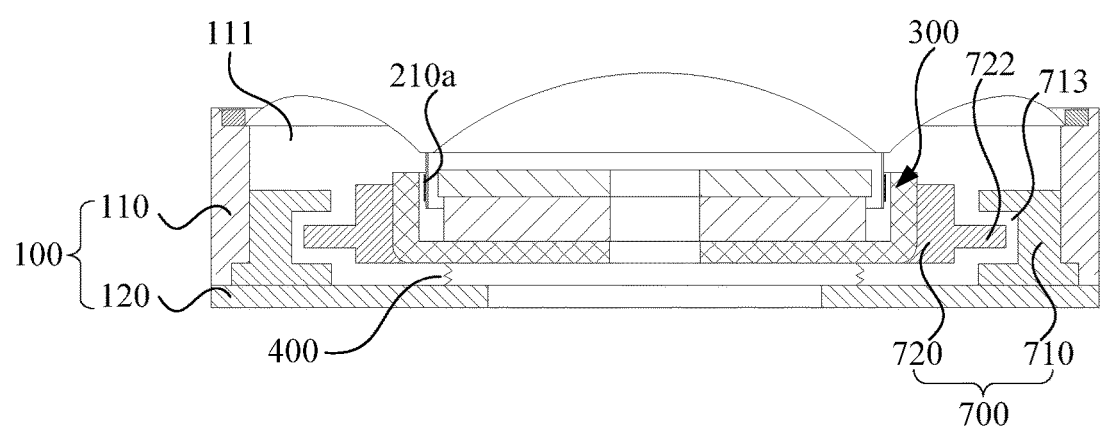
FIG. 11 is a schematic view of a limiting structure according to another embodiment.

In alternative embodiments, referring to FIG. 11, the stopper 720 has an inserting end 722, and the limiting member 710 defines a groove 713. The inserting end 722 is movably inserted in the groove 713. Thus, when the magnetic assembly 300 vibrates along with the elastic element 400 with respect to the housing 100, since the relative movement between the inserting end 722 and the groove 713 is confined within the groove 713, the amplitude of the relative vibration between the magnetic assembly 300 and the housing 100, which are respectively fixedly connected to the stopper 720 and the limiting member 710 will also be limited.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A loudspeaker unit, comprising: a housing, a magnetic assembly, a diaphragm, a first voice coil, a second voice coil and an elastic element; wherein the magnetic assembly is disposed in the housing, the diaphragm is disposed on the housing; the first voice coil is connected to the diaphragm; the magnetic assembly is connected to the housing by the elastic element; the magnetic assembly vibrates along with the elastic element with respect to the housing when the elastic element vibrates; wherein an annular gap and another annular gap are formed on a side of the magnetic assembly facing the diaphragm, one end of the first voice coil is connected to the diaphragm, the other end of the first voice coil extends into the annular gap; one end of the second voice coil is connected to the housing, the other end of the second voice coil extends into the another annular gap, wherein the housing is provided with a limiting structure configured to limit a vibration amplitude of the elastic element and/or the magnetic assembly with respect to the housing.

2. The loudspeaker unit according to claim 1, wherein the housing comprises a bracket and a protective cover connected to the bracket, the magnetic assembly is connected to the bracket by the elastic element, or the magnetic assembly is connected to the protective cover by the elastic element.

3. The loudspeaker unit according to claim 2, wherein the elastic element comprises a plurality of evenly distributed strip-shaped elastic sheets, which are radially surrounding the magnetic assembly, the plurality of strip-shaped elastic sheets are linear or wavy; or the elastic element is a circular elastic sheet defining a plurality of through holes evenly spaced along a circumferential direction thereof.

4. The loudspeaker unit according to claim 1, wherein the magnetic assembly comprises a magnetic sleeve and a ring magnet; the magnetic sleeve comprises a magnetic bottom cover, a magnetic sleeve body, and another magnetic sleeve body; the magnetic sleeve body and the another magnetic sleeve body are connected to the magnetic bottom cover; the ring magnet is connected to the magnetic bottom cover and is located in an annular groove cooperatively formed by the magnetic sleeve body and the another magnetic sleeve body, the annular gap is cooperatively formed between the ring magnet and the another magnetic sleeve body, the another annular gap is cooperatively formed between the ring magnet and the magnetic sleeve body.

5. The loudspeaker unit according to claim 4, wherein the elastic element comprises a plurality of evenly distributed strip-shaped elastic sheets, which are radially surrounding the magnetic assembly, the plurality of strip-shaped elastic sheets are linear or wavy; or the elastic element is a circular elastic sheet defining a plurality of through holes evenly spaced along a circumferential direction thereof.

6. The loudspeaker unit according to claim 1, wherein the limiting structure comprises a limiting member; an outer side of the limiting member is fixed on the housing, an inner side of the limiting member is in clearance fit with the magnetic assembly.

7. The loudspeaker unit according to claim 6, wherein the limiting member has an extending portion on a side thereof adjacent to the magnetic assembly, a clearance is defined between the extending portion and the elastic element; when the magnetic assembly vibrates along with the elastic element with respect to the housing, the extending portion limits the vibration amplitude of the elastic element.

8. The loudspeaker unit according to claim 6, wherein the limiting structure further comprises a stopper sleeved on the magnetic assembly; the stopper defines a groove, the limiting member has an inserting end; the inserting end is movably inserted in the groove.

9. The loudspeaker unit according to claim 6, wherein the limiting structure further comprises a stopper sleeved on the magnetic assembly; the limiting member defines a groove, the stopper has an inserting end; the inserting end is movably inserted in the groove.

10. A loudspeaker unit, comprising: a housing, a magnetic assembly, an auxiliary magnetic assembly, a diaphragm, a first voice coil, a second voice coil, and an elastic element; wherein the magnetic assembly is disposed inside the housing, the diaphragm is disposed on the housing; one end of the first voice coil is connected to the diaphragm, the other end thereof extends into a magnetic field of the auxiliary magnetic assembly; one end of the second voice coil is connected to the housing, the other end thereof extends into a magnetic field of the magnetic assembly; the magnetic assembly is connected to the housing by the elastic element; the magnetic assembly vibrates along with the elastic element with respect to the housing when the elastic element vibrates; the magnetic assembly is located on a side of the diaphragm, the auxiliary magnetic assembly is located on an opposite side of the diaphragm.

11. The loudspeaker unit according to claim 10, wherein the magnetic assembly comprises a first magnetic sleeve and a first columnar magnet mounted in the first magnetic sleeve, the first magnetic sleeve comprises a first magnetic bottom cover and a first magnetic sleeve body, the first magnetic bottom cover is connected to the first columnar magnet, the first magnetic sleeve body is mounted on the first magnetic bottom cover and surrounds the first columnar magnet; the first magnetic sleeve body and the first columnar magnet cooperatively form a first annular gap; the other end of the first voice coil extends into the first annular gap;

the auxiliary magnetic assembly comprises a second magnetic sleeve and a second magnet; the second magnetic sleeve comprises a second magnetic bottom cover, a second magnetic sleeve body, and a third magnetic sleeve body; the second magnetic sleeve body and the third magnetic sleeve body are connected to an edge of the second magnetic bottom cover; the second magnet is connected to the second magnetic bottom cover and is located in an annular groove cooperatively formed by the second magnet sleeve body and the third magnetic sleeve body, a second annular gap is cooperatively formed between the second magnet and the third magnetic sleeve body, a third annular gap is cooperatively formed between the second magnet and the second magnetic sleeve body; the other end of the second voice coil extends into the second annular gap.

12. The loudspeaker unit according to claim 10, wherein the elastic element comprises a plurality of evenly distributed strip-shaped elastic sheets, which are radially surrounding the magnetic assembly, the plurality of strip-shaped elastic sheets are linear or wavy; or the elastic element is a circular elastic sheet defining a plurality of through holes evenly spaced along a circumferential direction thereof.

13. The loudspeaker unit according to claim 10, wherein the housing comprises a bracket and a protective cover connected to the bracket, the magnetic assembly is connected to the bracket by the elastic element or the magnetic assembly is connected to the protective cover by the elastic element.

14. The loudspeaker unit according to claim 10, wherein the housing is provided with a limiting structure configured to limit a vibration amplitude of the elastic element and/or the magnetic assembly with respect to the housing.

15. A loudspeaker unit, comprising: a housing, a magnetic assembly, an auxiliary magnetic assembly, a diaphragm, a first voice coil, a second voice coil, and an elastic element; wherein the magnetic assembly is disposed inside the housing, the diaphragm is disposed on the housing; one end of the first voice coil is connected to the diaphragm, the other end thereof extends into a magnetic field of the auxiliary magnetic assembly; one end of the second voice coil is connected to the housing, the other end thereof extends into a magnetic field of the magnetic assembly; the magnetic assembly is connected to the housing by the elastic element; the magnetic assembly vibrates along with the elastic element with respect to the housing when the elastic element vibrates;

wherein the housing is provided with a limiting structure configured to limit a vibration amplitude of the elastic element and/or the magnetic assembly with respect to the housing; and wherein the limiting structure comprises a limiting member; an outer side of the limiting member is fixed on the housing, an inner side of the limiting member is in clearance fit with the magnetic assembly.

16. The loudspeaker unit according to claim 15, wherein the limiting member has an extending portion on a side thereof adjacent to the magnetic assembly, a clearance is defined between the extending portion and the elastic element; when the magnetic assembly vibrates along with the elastic element with respect to the housing, the extending portion limits the vibration amplitude of the elastic element.

17. The loudspeaker unit according to claim 15, wherein the limiting structure further comprises a stopper sleeved on the magnetic assembly; the stopper defines a groove, the limiting member has an inserting end; the inserting end is movably inserted in the groove.

18. The loudspeaker unit according to claim 15, wherein the limiting structure further comprises a stopper sleeved on the magnetic assembly; the limiting member defines a groove, the stopper has an inserting end; the inserting end is movably inserted in the groove.

* * * * *